Jan. 14, 1930.                W. ZUROVSKY                1,743,841
                              INSIDE VIGNETTER
                            Filed Dec. 22, 1928
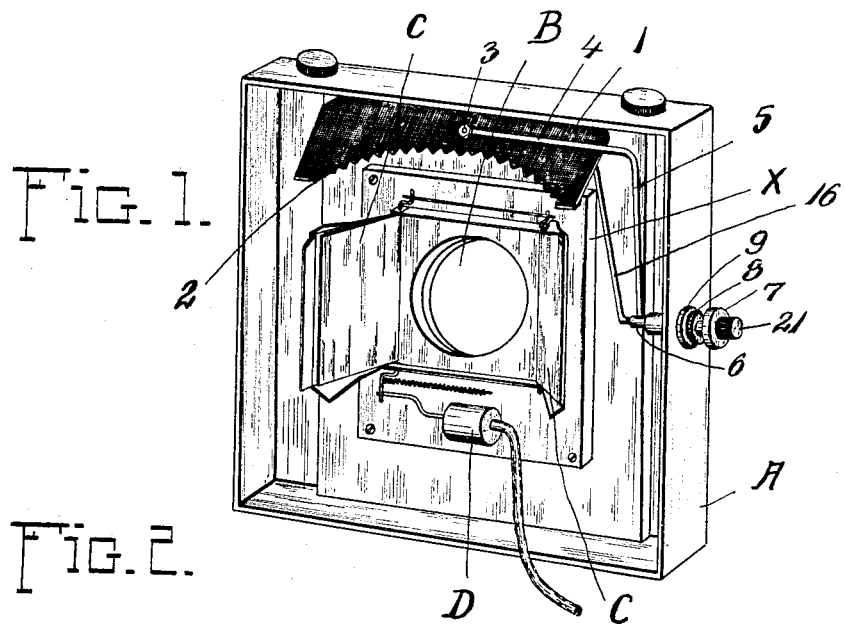
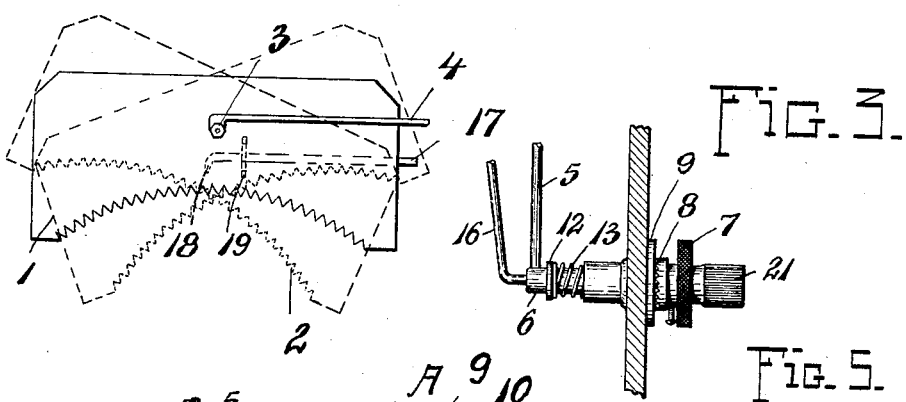
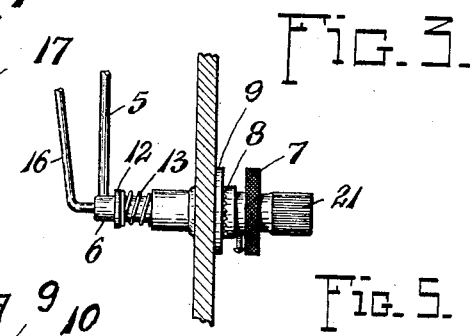
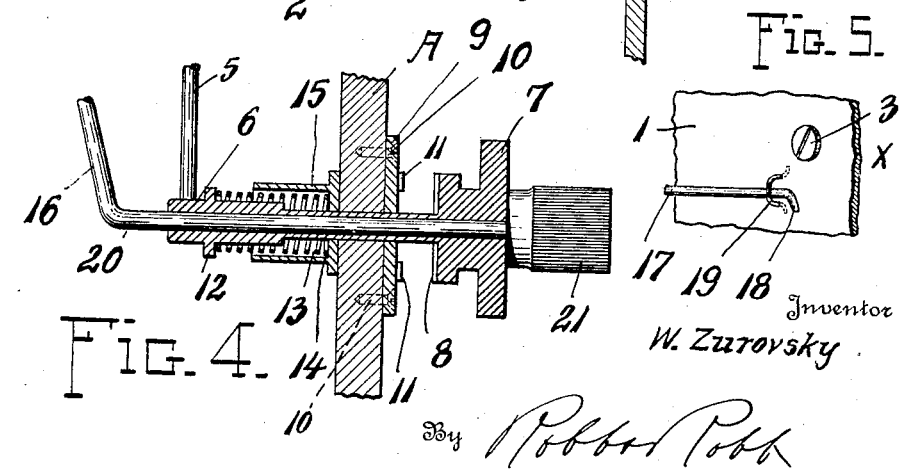
Inventor
W. Zurovsky
By Robert Robb
Attorneys Patented Jan. 14, 1930

1,743,841

UNITED STATES PATENT OFFICE

WLADIMIR ZUROVSKY, OF CLEVELAND, OHIO

INSIDE VIGNETTER

Application filed December 22, 1928. Serial No. 327,977.

It has long been the practice to employ a vignetter with cameras when it is desired to restrict or rather darken certain portions of a certain picture to be taken, the vignetter having received wide usage in the taking of bust pictures. Heretofore, the conventional method of using a vignetter has been to mount the same exterior of the camera proper. Such an arrangement necessitates the presence of various supporting and operating parts for the vignetter all exterior of the camera itself, which condition in no way lends itself to ready manipulation of the camera.

In view of the foregoing, the primary object of this invention is to provide a camera construction in which a vignetter is located inside the camera. In carrying out this idea more in detail, operating instrumentalities which are available from the exterior of the camera support on the interior of the latter, a vignetter, and these instrumentalities may be operated to move the vignetter into a position out of the way when its use is not desired, or into an operative position.

A more particular object of the invention is to provide a vignetter together with instrumentalities for moving the latter in an arc in the interior of a camera box. Such a vignetter has the distinct advantage of being movable into a position wherein it does not affect the picture taken by the camera and still not necessitate an increase in the size of the camera box. This object is achieved by mounting the vignetter on one arm of a crank while the other arm of the crank is pivotally mounted in the camera box, and suitable operating instrumentalities are provided for turning the crank whereby the vignetter is moved in the manner above set forth.

A further object of the invention is to provide for a vignetter of the character above described, a pivotal mounting whereby the latter may be turned when it is in operative position so that it may be adjusted to assume just the position desired by the operator of the camera.

An inside vignetter for cameras made in accordance with this invention is characterized by the fact that the vignetter is movable in two ways. One movement moves the vignetter as a whole in an arc into and out of operative position, while the other movement permits of its adjustment when in operative position.

These and other more detailed objects and advantages will in part become apparent and in part be hereinafter stated as the description of the invention proceeds.

For a full and more complete understanding thereof reference may be had to the following description and accompanying drawings, wherein, Figure 1 is a view in perspective showing the front end of a camera box from the inside, the camera itself being broken away.

Figure 2 is a detail view somewhat diagrammatic, developing the pivotal mounting and rotating action of the vignetter.

Figure 3 is a detail showing partly in section and somewhat fragmentary bringing out the mounting of the operating instrumentalities in the camera box.

Figure 4 is a view somewhat similar to Figure 3, parts of the operating instrumentalities being shown in section, and Figure 5 is a detail view bringing out the pivotal mounting of the vignetter and the means for rotating the latter.

While a preferred specific embodiment of the invention is herein set forth, it is to be understood that I am not to be limited to the exact constructions illustrated and described, because various modifications of these details may be provided in putting the invention into practice within the purview of the appended claims.

Throughout the various figures of the drawings and the following descriptions, like reference characters denote corresponding parts.

Referring now to Figure 1, which develops the instrumentalities on the interior of the front end of a camera construction, it is noted that camera A includes a lens opening B which is oft-times closed by shutters C. Instrumentalities shown at D are operable to open or close the shutter C with a snap movement as is well known in this art. A vignetter 1 is provided with a curved zigzag edge 2 in accordance with the usual custom, and this vignetter is carried by instrumentalities in such a manner that it is adapted to either be moved into the position shown in Figure 1, wherein it is completely out of the path of light rays coming through the opening B, or it is adapted to partially obstruct the opening B in accordance with the use of the vignetter, and by adjusting it in its position partially restricting the opening B. Vignetter 1 is of course colorless or black, as it is designed to render a portion of a picture black.

Referring now to Figures 3, 4, and 5, it is noted that the vignetter 1 is pivotally mounted at 3 on an arm 4 of crank arm 5. Crank arm 5 also comprises a hollow or sleeve like portion 6 which extends through the wall of the camera A. The sleeve 6 terminates in an operating member 7 which is provided with a tooth face shown at 8. Plate 9 is secured to the wall of the camera A in any preferred manner as by a screw shown at 10, and this plate is provided with diametrically opposed lugs 11 which are designed for cooperation with the tooth surface 8 of the operating member 7.

The sleeve 6 is provided with a shoulder 12 and a spring 13 bears against the shoulder 12 and the inner surface 14 of a housing 15 which is secured to the inner wall of the camera A. The function of the spring 13 is to normally maintain engagement between lugs 11 and the tooth surface 8 of the operating member 7, whereby rotation of this member is inhibited. However, this sleeve 6 may be rotated by pulling the operating member 7 outwardly against the action of the spring 13 to cause disengagement of the lugs 11 from the tooth-surface 8, whereupon it may be rotated to cause a corresponding swinging of the vignetter 1 which is carried by the arm 4.

A second crank 16 has an arm 17, the extremity of which is of a hook like shape, as shown in Figure 5 and indicated at 18, and this arm 17 extends loosely through a hasp 19 fastened to the vignetter 1 and disposed off center with the pivotal mounting 3.

Crank 16 includes an arm 20 which extends through the sleeve 6 and carries at its outer end an operating member 21 in the form of a knurled knob. By turning the knob 21, the crank 16 is operated to cause a shifting of the vignetter 1 on its pivotal mounting 3 by virtue of the offset mounting of the hasp 19 in respect to the pivotal point 3.

From the foregoing it will be apparent that the operating member 7 is available as a means for moving the vignetter as a whole into or out of operative position, while the operating member 21 is a means for rotatably adjusting the vignetter 1 when the latter is in its position partly restricting the opening B.

I wish it to be particularly understood that while I have shown one set of instrumentalities for mounting the vignetter as above described, that other mechanisms could well be employed for mounting the vignetter in a similar manner, obtaining the same operation and results. For this reason I wish to be limited in the interpretation of the breadth of the invention only by the following claims.

Having thus described my invention, what I claim as new and desire to secure by Letters Patent of the United States, is:—

1. In a camera construction of the class described, the combination, of a vignetter having a lens opening therein, control means for moving the same into a position inside the camera partially restricting the opening, and means for adjusting the vignetter when it is in the last named position.

2. In a camera construction of the class described, the combination, with a camera box having an opening therein, of a vignetter, and instrumentalities located on the outside of the camera box for mounting the vignetter on the inside of the camera box, said instrumentalities comprising control means for moving the vignetter in a plurality of angular directions for partially restricting the opening in the camera box.

3. In a camera of the class described, the combination, with a camera box having an opening therein, of a vignetter, means for pivotally supporting the vignetter, mechanism for bodily moving the vignetter and its pivotal support, and control instrumentalites for rotating the vignetter on its pivotal support.

4. Vignetter mechanism of the class described, comprising, in combination, a camera construction having an opening therein, a vignetter, means for mounting the vignetter on the interior of the camera box, said means being operable to swing the vignetter into and out of the position restricting the camera opening in an arc-like path, and separate means for adjusting the vignetter in its position partially restricting the opening.

5. Vignetter mechanism of the class described, comprising, in combination, a camera construction having an opening therein, a vignetter, means for mounting the vignetter on the interior of the camera box, said means being operable to swing the vignetter into and out of a position restricting the camera opening in an arc-like path, and separate means for holding the vignetter in its position partially restricting the opening.

6. Vignetter mechanism of the class described, comprising, in combination, a camera construction having an opening therein, a vignetter, means for mounting the vignetter on the interior of the camera box, said means being operable to swing the vignetter into and out of a position restricting the camera opening, and means for holding the vignetter in any one of its adjusted positions.

7. Vignetter mechanism of the class described, comprising, in combination, a vignetter, a crank having one arm pivotally supporting the vignetter, while the other arm has bearing in a camera construction, an operating member for rotating the crank, interlocking means for normally preventing rotation of the crank, and yieldable means normally maintaining engagement between parts of the interlocking means.

8. Vignetter mechanism of the class described, comprising, in combination, a vignetter, a crank supporting the vignetter for movement on the interior of a camera, and a second crank for rotatably adjusting the vignetter.

9. Vignetter mechanism of the class described, comprising, in combination, a vignetter, a crank supporting the vignetter for movement on the interior of a camera, and a second crank for rotatably adjusting the vignetter, said cranks having arms co-axially mounted in a camera construction.

10. Vignetter mechanism of the class described, comprising, in combination, a vignetter, a crank supporting the vignetter for movement on the interior of a camera, and a second crank for rotatably adjusting the vignetter, said cranks having operating arms exteriorly disposed with respect to the camera box.

In testimony whereof I affix my signature.

WLADIMIR ZUROVSKY.